No. 766,834. Patented August 9, 1904.

UNITED STATES PATENT OFFICE.

DOROTHEA MARKFELD, OF HOMESTEAD, NEW JERSEY.

ARTIFICIAL FUEL.

SPECIFICATION forming part of Letters Patent No. 766,834, dated August 9, 1904.

Application filed October 14, 1903. Serial No. 177,058. (No model.)

*To all whom it may concern:*

Be it known that I, DOROTHEA MARKFELD, a citizen of the Empire of Germany, residing in Homestead, in the county of Hudson and State of New Jersey, have invented certain new and useful Improvements in Artificial Fuel, of which the following is a specification.

This invention relates to artificial fuel, and has for its purpose the utilization of garbage and other animal and vegetable wastes which are collected from dwellings, factories, shops, and other places.

The utilization of garbage and similar waste for artificial fuel has been attempted in different ways heretofore, but without any practical success, as most of the garbage collected by many municipalities is still burned in so-called "garbage-crematories."

The object of this invention is to so prepare the garbage and other waste after it is collected that a very useful product—namely, artificial fuel in the form of briquets—is obtained therefrom.

The objection to artificial fuel made from garbage was mainly that the smell produced by the decomposition of the vegetable and animal waste contained in the fuel was not sufficiently neutralized. This rendered the fuel objectionable both while in storage and when burned in the stove, range, or furnace. For removing the obnoxious odors it is necessary first to separate the vegetable from the animal matters in the garbage or other waste—that is to say, assort the fruit remnants, vegetable refuse, &c., separately from the animal refuse, also from the combustible waste, such as coal particles, paper scraps, and other combustible substances—next, thoroughly dry the vegetable refuse and comminute the same and then utilize it in connection with suitable binding, coloring, and deodorizing substances; and for this purpose the invention consists of an artificial fuel which comprises dry comminuted vegetable waste, coal particles, and other combustible material, fatty substances, a binding substance, a black coloring-matter, and a deodorizing substance, such as crude carbolic acid, which substances are mixed together in proportions hereinafter described and then pressed in the form of lumps or briquets.

In carrying out my invention the garbage, ashes, and other kitchen waste are first assorted, so as to separate the vegetable waste from the fatty waste and from the combustible waste, such as unburned coal particles, paper scraps, &c. The vegetable refuse is then thoroughly dried and comminuted. The ashes are screened, so as to separate the unburned coal particles and other combustible matter. Twenty-one parts, by weight, of dry and comminuted vegetable garbage, eight parts, by weight, of coal-dust, coal particles, or other combustible substances, one part, by weight, of unslaked lime, one part, by weight, of cement, one part of lampblack or other coloring-matter, two parts, by weight, of fatty waste, and one-fourth part, by weight, of crude carbolic acid for every two parts, by weight, of the mixture are thoroughly mixed with five parts, by weight, of water into a thick pasty mass, which is then pressed in a briquet-machine into lumps or briquets that are dried in the open air. The proportion of combustible and fatty substances has to be such that the dry vegetable waste is readily burned when the fuel is burned. The lime and cement act as a binding substance, by which the mass is firmly held together. The carbolic acid acts as a deodorizer and disinfectant for preventing any disagreeable smells during the manufacture, storage, and burning of the fuel. The addition of carbolic acid or other deodorizing substance is necessary, as without the same the fuel could not be stored or burned without emitting objectionable odors. By the thorough intermixing of the ingredients the carbolic acid penetrates all the parts, prevents the decomposition of the vegetable and animal waste, and neutralizes the odors of the same. The lampblack is added to give the mass a black color and the appearance of natural coal. If this be not sufficient to impart a deep black color, a small quantity of anilinblack may be added. When the fuel is pressed into shape, it can be shipped and handled like ordinary coal.

My improved fuel is easily ignited and burns with a light flame. It can be burned in stoves and ranges as well as in steam-boiler and other furnaces. It is perfectly unobjectionable, owing to the deodorizing and antiseptic action of the carbolic acid contained therein.

Having thus described my invention, I claim as new and desire to secure by Letters Patent—

An artificial fuel, consisting of a compacted mixture of comminuted dry vegetable garbage, coal-dust and other combustible matters, fatty waste, lime, cement, crude carbolic acid, and lampblack, substantially as set forth.

In testimony that I claim the foregoing as my invention I have signed my name in presence of two subscribing witnesses.

DOROTHEA MARKFELD.

Witnesses:
PAUL GOEPEL,
HENRY J. SUHRBIER.